United States Patent [19]

Lagerberg

[11] Patent Number: 4,714,384
[45] Date of Patent: Dec. 22, 1987

[54] TOOL AND INSERT, PREFERABLY FOR TURNING

[75] Inventor: Stig E. V. Lagerberg, Sandviken, Sweden

[73] Assignee: Santrade Limited, Lucerne, Switzerland

[21] Appl. No.: 863,934

[22] Filed: May 16, 1986

[30] Foreign Application Priority Data

May 17, 1985 [SE] Sweden .................. 8502451

[51] Int. Cl.⁴ .............................................. B23B 27/16
[52] U.S. Cl. ...................................... 407/103; 407/62; 407/104; 407/106; 407/109; 407/113
[58] Field of Search ............... 407/91, 103, 104, 106, 407/107, 109, 110, 112, 113, 62

[56] References Cited

U.S. PATENT DOCUMENTS

| | | | |
|---|---|---|---|
| 3,220,088 | 11/1965 | Brundin et al. | 407/113 |
| 3,488,823 | 1/1970 | Wirfelt . | |
| 3,551,977 | 1/1971 | Novkov | 407/103 |
| 3,813,747 | 6/1974 | Hertel | 407/113 |
| 3,821,837 | 7/1974 | Faber | 407/112 |
| 4,035,890 | 7/1977 | Eriksson et al. | 407/104 |
| 4,050,127 | 9/1977 | Bodem et al. | 407/113 |
| 4,480,950 | 11/1984 | Kraft et al. | 407/103 |
| 4,632,606 | 12/1986 | Lagerberg | 407/113 |

FOREIGN PATENT DOCUMENTS

| | | | |
|---|---|---|---|
| 2031832 | 12/1971 | Fed. Rep. of Germany | 407/104 |
| 2916809 | 11/1979 | Fed. Rep. of Germany | 407/15 |
| 2848126 | 4/1980 | Fed. Rep. of Germany | 407/113 |

Primary Examiner—M. Jordan
Assistant Examiner—Jerry Kearns
Attorney, Agent, or Firm—Burns, Doane, Swecker & Mathis

[57] ABSTRACT

The invention relates to a tool preferably for turning, and an insert therefor. The tool comprises a shank (11) upon which a loop-shaped outer disc (12) is secured. An inner disc (13) is displaceably arranged between the arms of the outer disc (12). A screw (15) is arranged to push the inner disc (13) forwards relative to the outer disc during inward screwing, such that the fore ends of the inner disc force the lower face of the insert against the upper face of the shank (11). The insert (14) is provided with a hole which is arranged to be wedged up on a pin (36) extending in the hole during a forward movement of the insert at the same time as the pin and the hole comprise cooperating surfaces to force the lower face of the insert against the upper face of the shank.

16 Claims, 10 Drawing Figures

TOOL AND INSERT, PREFERABLY FOR TURNING

BACKGROUND AND OBJECTS OF THE INVENTION

The invention relates to a tol and an insert, preferably for turning. The tool comprises a shank whose head portion is provided with a projection in order to engage with a hole in an insert provided with cutting portions and support surfaces provided to force the lower face of the insert into abutment with the mainly planar upper face of the head portion. The support surfaces which are arranged on a reciprocable first unit, engage with recesses in at least one edge surface of the insert. The hole of the insert is slidably arranged about the projection in order to wedge up on it during a forward movement of the insert.

In known inserts for turning, for example a rhombical insert, the insert is positioned in an insert site such that two cutting edges are exposed outside the insert holder to make it possible to turn both right-handed and left-handed. This means that the distance between the tip of the insert and the support points of the insert against the insert site coresponds to approximately half the length of an insert edge. An insert edge length is thus the moment arm by which the cutting forces influence the insert site. In conventional inserts the support points in the insert site are deformed and displaced such that the positioning of a new insert is deteriorated. A defective depth is caused in the work piece, since the tip of the insert then in some cases describes a movement of an arc of a circle. Furthermore it is previously known to arrange a wedge device between a planar side surface on the insert and a projecting surface on the tool shank. the wedge device forces the insert forwardly against a pin, secured into the planar upper face of the shank and received by the center hole of the insert. The distance between the tip of the insert and the support points of the insert is large also in that type of tool.

THE DRAWINGS

The objects of the present invention are to avoid the abovementioned and other problems. The invention will be more closely described in connection with the appended drawings in which.

DETAILED DESCRIPTION OF PREFERRED EMBODIMENT OF THE INVENTION

Figure 1:
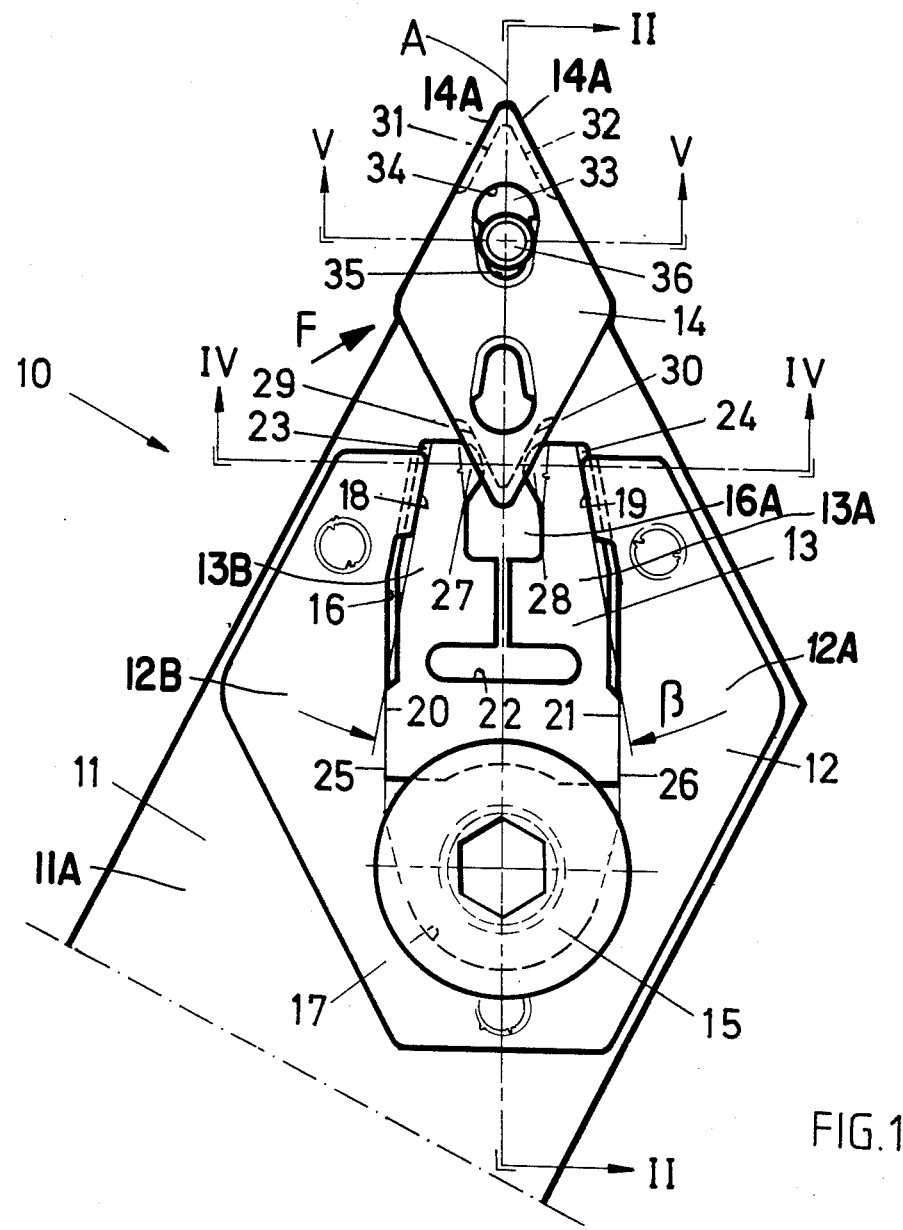
FIG. 1 shows the end of a turning tool and an insert according to the invention, in plan view.
Figure 2:
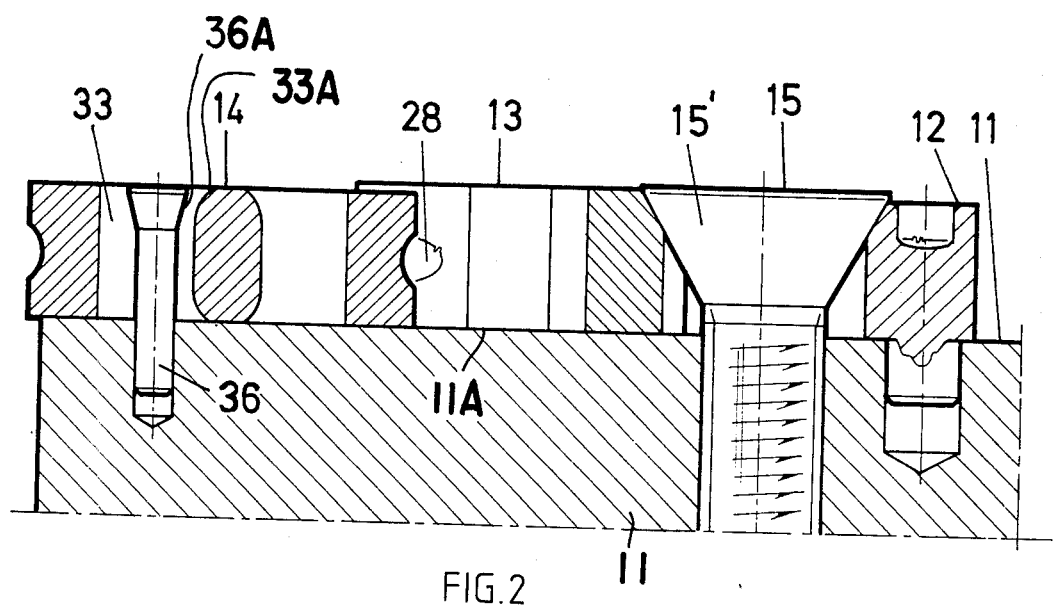
FIG. 2 shows a part of the working end of the tool in a crosssection according to the line II—II in FIG. 1.
Figure 3:
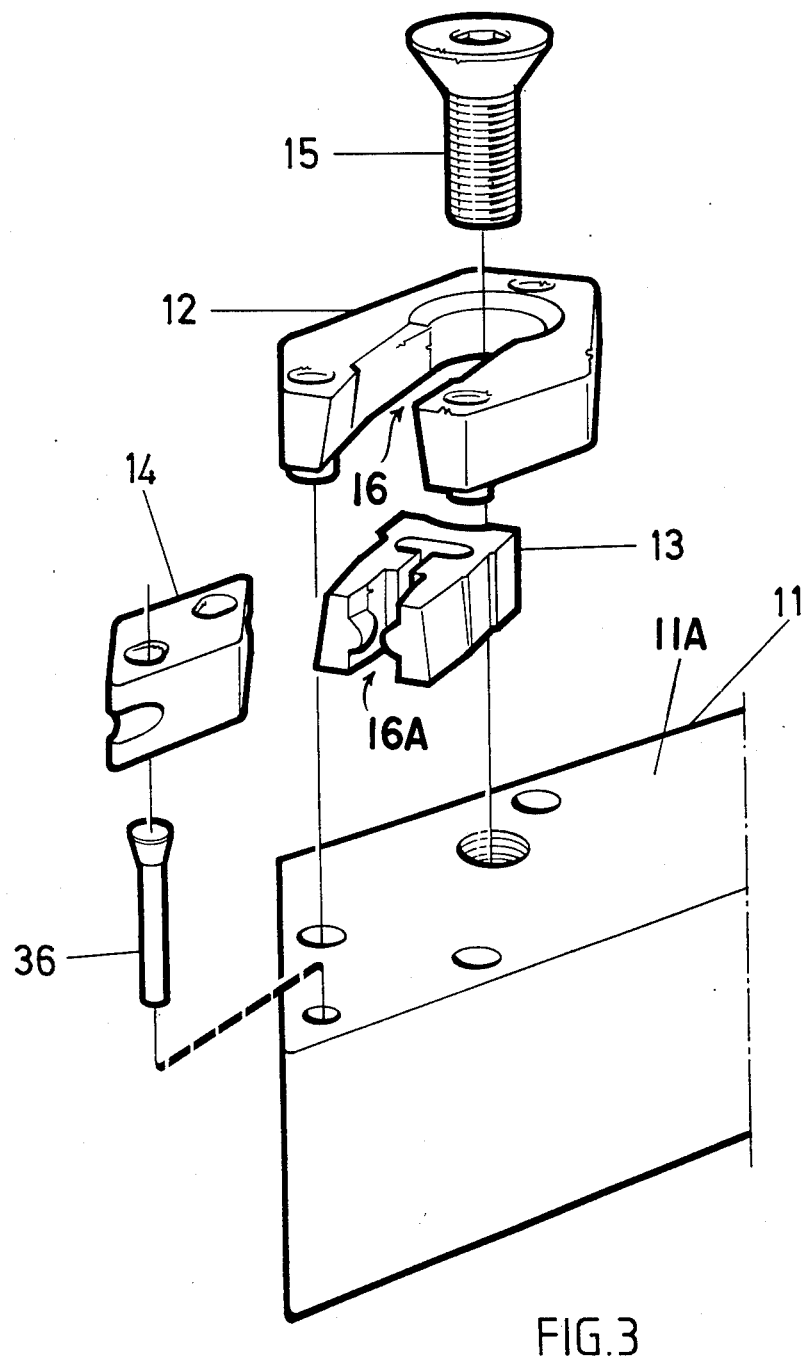
FIG. 3 shows the outermost part of the tool in an exploded view.

FIGS. 1, 2 and 3 show the working end of a turning tool 10 comprising a shank 11, a separate outer disc 12 provided to be secured to the shank and receiving an inner disc 13, an insert 14 and an adjusting screw 15. The insert includes cutting edges 14A. The upper surface 11A of the shank 11 which is mainly planar, is built up at the end with an outer disc 12 which is provided with three guiding pins at the lower face engaging in recesses in the upper face of the shank 11 with a press-fit. The guiding pins shall, in cooperation with some securing method, gluing or welding for example, secure the outer disc 12 to the shank 11.

The outer disc 12 is C-shaped or loop-shaped and has two outer arms 12A, 12C which mainly surround the inner disc 13. The inner disc 13 is received by an outer groove 16 in the disc 12 traversing the normal direction of said upper face and which is opened in the end of the outer disc 12 which is turned towards the working cutting tip.

The groove 16 is terminated in its other end in an at least partly rounded-off spacing 17, which is provided to receive the adjusting screw 15. The outer disc 12 has support surfaces 18, 19 consisting of the walls of the groove 16 which are closest to the opening of the groove in direction towards the insert. The support surfaces 18, 19 diverge from each other such that the distance between their extension lines increases in direction from the insnert toward the screw 15. The angle $\beta$ between the extension lines is between 10° to 30°. The support surfaces 20, 21 are parallel with the longitudinal axis A of the insert. The wall of the groove 16 is broken between the support surfaces 18 and 20 resp. 19 and 21.

The inner disc 13 is displaceably arranged within the outer disc 12. The inner disc 13 is also C-shaped or loop-shaped. The ends of its arms 13A, 13B define an inner groove 16A which partly encloses an acute-angled corner of the insert. The arms are resiliently arranged relative to each other by means of a slot 22. The inner disc 13 has support surfaces 23,24,25,26 facing the support surfaces of the outer disc 12. The support surfacew 23–26 and the surfaces 18–21 have the same geometrical relationship to the longitudinal axis A of the insert. The inner parts of the ends of the arms carry rounded-off projections 27, 28.

The insert 14 has a rhombical basic shape and comprises acuteangles and obtuse-angled corners, parallel flat surfaces connected by edge surfaces. The lines of intersection between flat surfaces and edge surfaces form cutting edges. The edge surfaces are provided with concave recesses 29,30 and 31,32, at least at the acute-angled corners. Each recess that can be V- or U-shaped, preferably the latter shape, has a larger radius than each projection 27,28, seen in a plane normal to the upper face of the head portion.

The insert 14 is provided with at least one hole 33, which extends perpendicularly to the lower flat surface. The hole 33 is arranged symmetrically around the longitudinal axis A and shaped such that a wide section 34 is arranged closer to the acute-angled corner than a narrower section 35. The hole 33 tapers continuously from the wider section 34 to the narrower section 35. The largest width of the wider section 34 is larger than the largest diameter of a positioning pin 36 while the smallest width of the narrower section 35 is less than the largest diameter of the positioning pin 36. The hole 33 is widened in the vicinity of the flat surfaces at the tapering portion and the narrower section 35. In FIG. 1 the insert is provided with two holes such that the insert may be indexed after it has been worn in one position. The noncutting corner of the insert, which is directed inwardly towards the adjusting screw 15, is passive in one position, in the sense of cutting. These corners interchange position at the indexing. The adjusting screw may alternatively be replaced by a powerful spring.

When the insert is to be mounted, the adjusting screw is unscrewed and the inner disc 13 is retracted. The insert 14 is positioned such that the positioning pin 36 enters into the wider section 34 of the hole 33, and such that the non-cutting, acute-angled corner of the insert is arranged between the projections 27,28 of the inner disc 13. The adjusting screw 15 is screwed inwardly thereafter so that its conical head 15' abuts against complementary surfaces on the outer and inner discs. The inner disc 13 is thereby forced to move forwardly relative to the outer disc 12 at the same time as the arms of the inner disc 13 are forced in direction towards each other by the support surfaces 18, 19 of the outer disc 12, while the support surfaces 20,21 on the outer disc guide the inner disc in a direction parallel with the longitudinal axis A. When the projections 27,28 abut the recesses 29,30 in the edge surfaces of the insert, the insert is moved forwardly relative to the pin 36 until the width of a contact surface 33A of the hole of the hole corresponds to the diameter of the pin, and therefore the insert is wedged up on a contact surface 36A of the pin.

The surfaces or points of the tapering portion of the hole 33, which cooperte with the pin, are arranged at a distance a from the center of the insert, which distance a is 0.5 to 1.5 times the radius R of a largest circle inscribed within the insert.

Figure 2A:
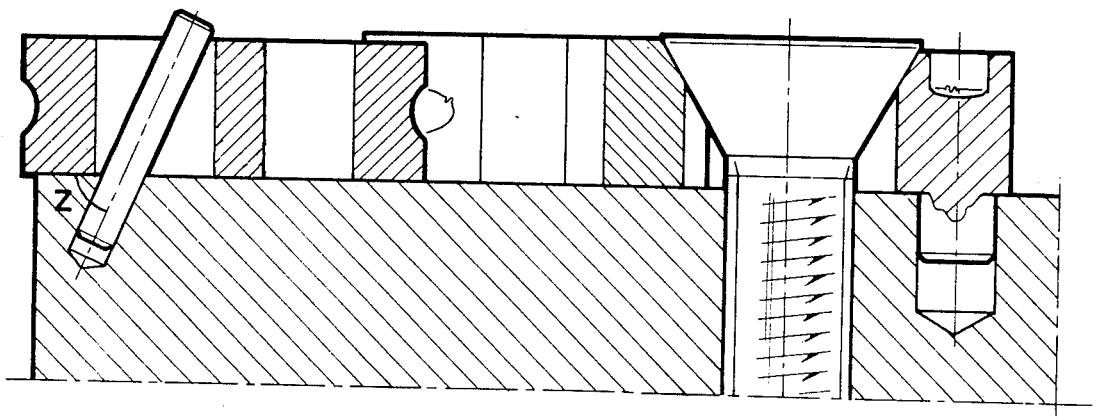
FIG. 2A shows a part of the working end of the tool in a crosssection.

In FIG. 2A it is shown that a completely cylindrical pin can replace the above-mentioned pin 36. The pin is thus positioned in a boring which forms an acute angle z with the upper face of the shank. The advantage with this embodiment is that the wall of the insert hole can be completely perpendicular to the lower face of the insert and the insert becomes more simple to manufacture. The mounting of the insert is done in a manner corresponding to the one described above.

The above-mentioned procedure is reversed when removing the insert. Suitably a tool of some sort is used to force the inner disc 13 backward.

Figure 4:
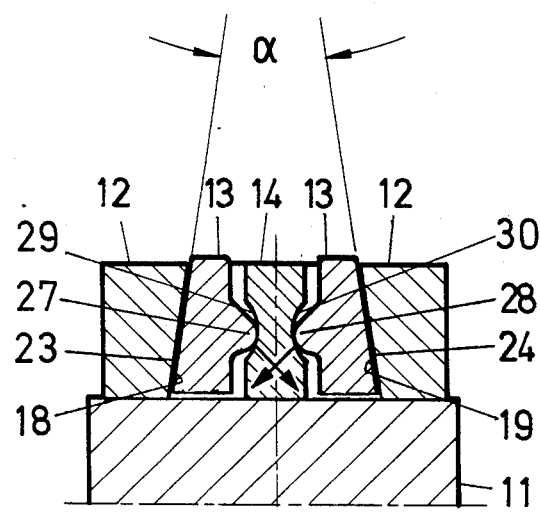
FIG. 4 shows a part of the working end of the tool in crosssection according to the line IV—IV in FIG. 1.

FIG. 4 shows the tool in cross-section in the clamped position. The projections 27,28 of the inner disc 13 abut against the lower parts of the recesses 29,30 in the edge surfaces of the insert 14. The projections force the insert against the upper face of the tool shank through cooperation between the support surfaces 23,24 of the inner disc 13 and the support surfaces of the outer disc 12. The support surfaces 18,23 and 19,24 converge in a direction from the upper face of the tool shank and form an angle α with each other. The angle α is suitably chosen within the interal 10° to 30°. The tool is arranged such that a small play arises between the lower face of each arm on the inner disc and the upper face of the shank. The resultant forces of the projections against the insert are illustrated by arrows in the figure. This illustrates how the insert is forced against the upper face of the shank. The points of abutment between the projections and the recesses are provided on opposite sides of the longitudinal axis of the insert.

Figure 5:
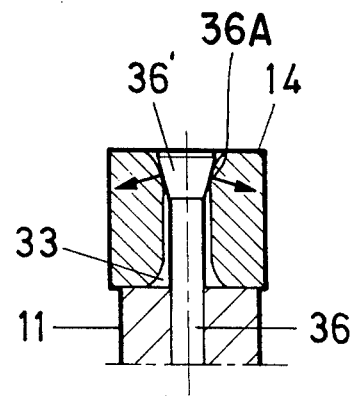
FIG. 5 shows a part of the working end of the tool in crosssection according to the line V—V in FIG. 1.

FIG. 5 shows another cross-section through the tool in the clamped position. The pin 36, whose center line is perpendicular to the upper face of the shank 11, has a conical head 36', which cooperates with the upper portion of the hole 33. The upper portion is a termination of the hole and has a convexly increasing hole width in direction towards the flat surface of the insert. The contact surface 36A of the head 36' of the pin presses the lower flat surface of the insert against the upper face of the shank. The points of abutment between the head and the hole are provided on opposite sides of the longitudinal axis of the insert. This embodiment has four active support points for the insert without being a statically over-determined clamping system, which is unique, two of which are arranged close to the cutting corner. The movement of the insert thereby becomes a minimum. The forces that arise during facing operations, see arrow F in FIG. 1, are effectively received by the pin 36.

Figure 6:
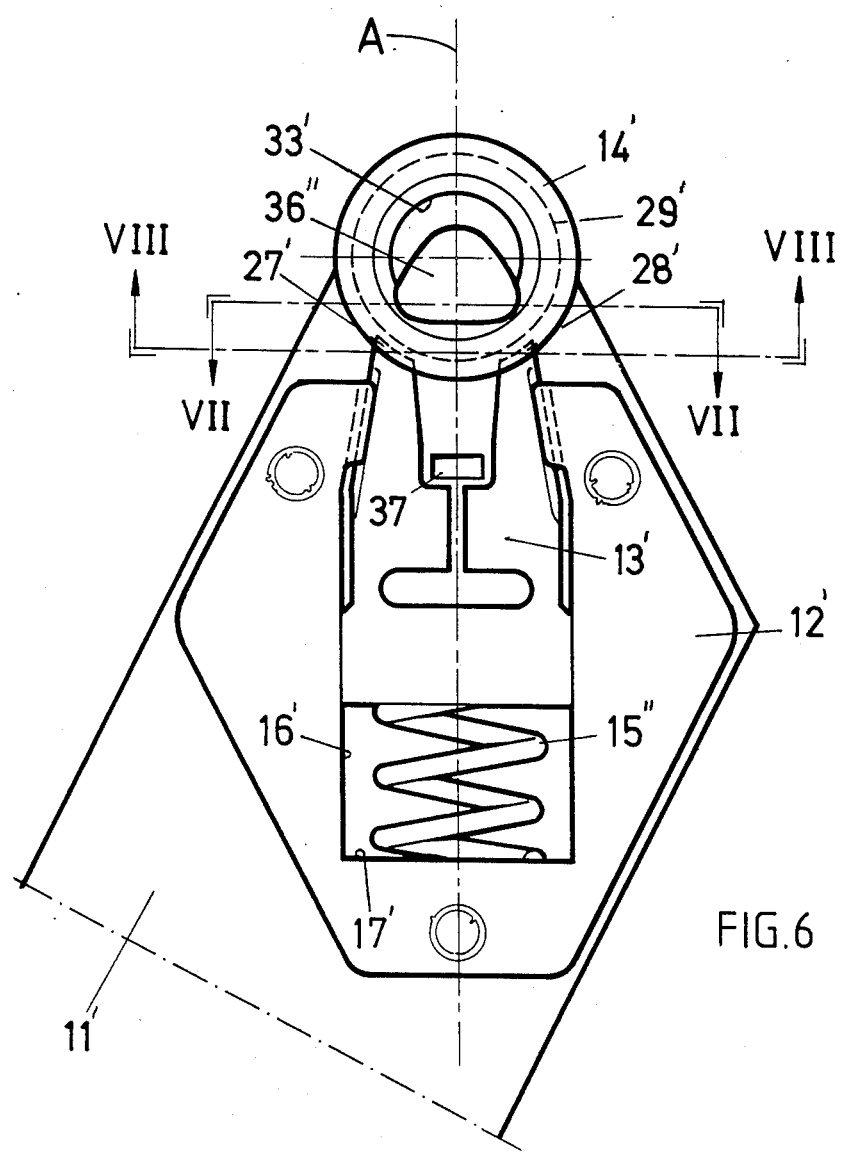
FIG. 6 shows an alternative embodiment of a turning tool and an insert according to the invention, in plan view.
Figure 7:
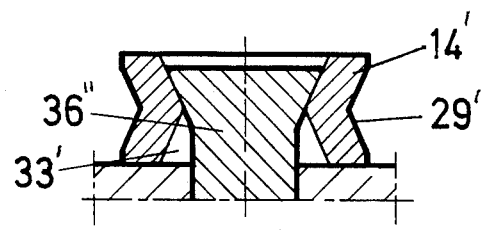
FIGS. 7 and 8 show the turning tool in cross-section according to the line VII—VII in FIG. 6 and according to the line VIII—VIII in FIG. 6, respectively.
Figure 8:
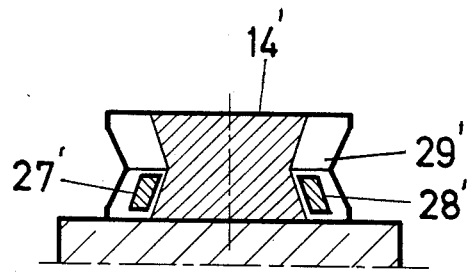
Figure 9:
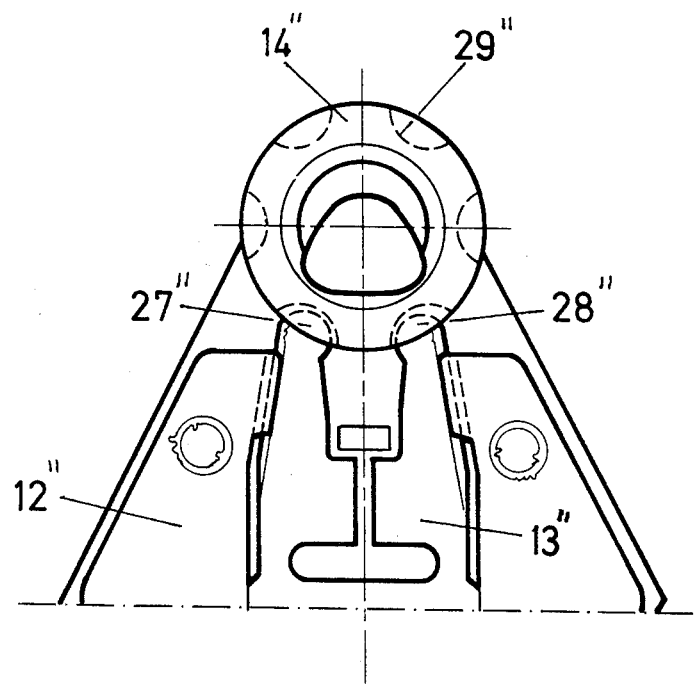
FIG. 9 shows another alternative embodiment of a turning tool and an insert according to the invention in a plan view.

FIGS. 6–8 show an alternative embodiment of a tool according to the invention. A round insert 14' is clamped to the tool shank 11'. The outer disc 12' encloses the inner disc 13' just as mentioned above. The arms of the inner disc 13' are forwardly terminated by the projections 27', 28'. A powerful spring 15" supports against the plane surface 17' and forces the inner disc 13' forwardly relative to the outer disc 12'. The projections thereby engage in the lower part of an annular recess 29' and force the insert forwardly and downwardly. The pin 36" comprises a conical abutment surface on both sides of the axis A, which abuts against a round hole 33' in the insert 14'. The largest width in a plane parallel with the upper face of the shank is less than the smallest diameter of the hole 33', such that the insert 14' easily can be loosened from the pin. The hole 33' is conically or convexly widened in the vicinity of the flat surfaces. The pin 36" and the hole 33' cooperate in order to force the insert against the bed. The surfaces or points of the hole 33', which cooperate with the pin, are arranged at a distance a' from the center of the insert which distance a' is 0.5 to 0.75 times the radius R' of a largest circle inscribed within the insert. This circle coincides with the periphery of the insert. A recess 37 is formed in the upper face of the head portion. This recess is a grip for a tool to restore the inner disc 13' on removal of the insert. When the cutting edge of the insert has been owrn, the insert is turned, slightly less than 90°, or the insert is indexed thereby presenting a new sharp cutting edge. The spring may alternatively be replaced by a screw in the corresponding manner as shown in FIGS. 1 and 2. FIG. 9 shows another alternative embodiment of a tool according to the invention. The edge surfaces of the insert 14" have recesses 29" separated from each other, each said recess has a spherically concave shape. The radius of the recess is larger than the radius of each of the spherically convex projections 27", 28" on the arms of the inner disc 13".

The mounting and clamping of the insert 14" is done in the corresponding manner as described in connection with FIGS. 6–8. The insert 14" will be better secured against rotation with these recesses than the insert 14'.

The above-mentioned inserts 14, 14', 14" may also have alternative shapes within the scope of the subsequent claims. The inserts may have chip breakers of various kinds, such as recesses, grooves or projections.

Thus, the present invention relates to a tool and an insert, wherein the insert and the clamping unit are shaped for safely securing the insert relative to the upper face of the shank.

I claim:

1. A tool comprising:
   a shank including:
      an upper surface, and
      a projection upstanding from said upper surface and including first contact surface means,
   an insert including:
      a lower surface for engaging said upper surface,
      cutting edge means at a front edn of said insert,
      a hole for receiving said projection and including second contact surface means arranged to engage said first contact surface means on opposite sides of an imaginary front-to-rear reference line extending through said insert, and
      third contact surface means disposed adjacent a rear end of said insert,
   a unit disposed to the rear of said insert and movable forwardly and rearwardly, said unit including fourth contact surface means arranged to contact said third contact surface means on opposite sides of said reference line,
   said first and fourth contact surface means oriented to force said lower surface downwardly against said upper surface in response to said insert being urged forwardly by said unit, and
   means for urging said unit forwardly.

2. A tool according to claim 1, wherein said projection comprises a pin having a head at least a part of which is conical and defines said first surface means, said pin extending perpendicularly to said upper surface.

3. A tool according to claim 1 including an additional unit including a pair of arms between which said first-named unit is disposed, said arms including contact surfaces oriented to engage and force said first-named unit downwardly against said upper surface in response to forward movement of said first-named unit.

4. A tool according to claim 1, wherein said hole includes a wide front portion and a narrow rear portion, a largest cross-section of said pin being smaller than said wide portion and narrower than said narrow portion.

5. A tool comprising:
   a shank including:
      an upper surface defining a seat for receiving a cutting insert, and
      a projection upstanding from said upper surface and adapted to enter a hole in the cutting insert,
   an outer unit mounted on said upper surface rearwardly of said projection and including two outer arms defining therebetween an outer groove opening toward said seat,
   an inner unit mounted in said outer groove for movement forwardly and rearwardly therein, said inner unit including two inner arms defining therebetween an inner groove opening toward said seat to receive a rear end of a cutting insert,
   said outer arms including contact surfaces oriented to engage said inner arms in a manner forcing said inner arms toward one another and toward said upper surface in reponse to forward movement of said inner unit in order to grip and stabilize the cutting insert, and
   means for urging said inner unit forwardly.

6. A tool according to claim 5, wherein said contact surfaces converge in a first direction toward said seat and in a second direction away from said upper surface.

7. A tool according to claim 5, wherein said outer groove includes parallel guide surfaces oriented in a front-to-rear direction and engageable with corresponding surfaces on said inner arms to guide said inner unit.

8. A tool according to claim 5, wherein said means for urging said inner unit forwardly acts against a rear end of said outer groove and a rear end of said inner unit.

9. A tool according to claim 8, wherein said means for urging said inner unit forwardly comprises a screw with a conical head.

10. A tool according to claim 8, wherein said means for urging said inner unit forwardly comprises a spring.

11. An insert adapted to be clamped in a tool shank, said insert comprising two parallel side surfaces interconnected by edge surfaces to form a rhombic shape having two diagonally disposed acute angle corners bisected by an imaginary diagonal line, a pair of holes having their centers lying along said diagonal line, one hole disposed closer to one said corner and the other hole disposed closer to the other said corner, each said hole including a wide portion tapering away from its associated corner toward a narrower portion of said hole, each said corner defined by a pair of said edge surfaces in which are disposed concave recesses.

12. An insert adapted to be clamped in a tool shank, said insert comprising two parallel side surfaces interconnected by a circular edge surface to form a circular cutting edge, a circular through-hole extending centrally through said side surfaces, said hole having a cross-section which widens as it approaches at least one of said side surfaces, and concave recess means formed in said edge surface.

13. An insert according to claim 12, wherein said recess means comprises an annular recess extending completely around a circumference of said edge surface.

14. An insert according to claim 13, wherein said hole has a cross-section whichis narrowest at about the mid-height of said insert and widens toward both said side surfaces, said recess has a depth which is greatest at about the mid-height of said insert and becomes progressively smaller toward both said side surfaces.

15. An insert according to claim 12, wherein said recess means comprises a plurality of concave recesses spaced circumferentially around said edge surface.

16. An insert according to claim 15, wherein said hole has a cross-section which is narrowest at about the mid-height of said insert and widens toward both said side surfaces, each of said recesses has a depth which is greatest at about the mid-height of said insert and becomes progressively smaller toward both said side surfaces.

* * * * *